(12) United States Patent
Sunahara

(10) Patent No.: US 8,681,197 B2
(45) Date of Patent: Mar. 25, 2014

(54) COMMUNICATION SYSTEM, TERMINAL APPARATUS AND COMPUTER PROGRAM

(75) Inventor: Sei Sunahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1836 days.

(21) Appl. No.: 11/604,404

(22) Filed: Nov. 27, 2006

(65) Prior Publication Data

US 2007/0120958 A1  May 31, 2007

(30) Foreign Application Priority Data

Nov. 29, 2005  (JP) ................................ P2005-344746

(51) Int. Cl.
*H04N 7/14* (2006.01)

(52) U.S. Cl.
USPC ........................................ 348/14.01; 382/239

(58) Field of Classification Search
USPC ..................... 348/14.01–14.12; 709/204–205
See application file for complete search history.

(56) References Cited

U.S. PATENT DOCUMENTS

| | | | |
|---|---|---|---|
| 5,898,457 A * | 4/1999 | Nagao et al. ................. | 348/14.1 |
| 2002/0089518 A1 * | 7/2002 | Shigeta ........................ | 345/629 |
| 2004/0117445 A9 * | 6/2004 | Lee et al. ...................... | 709/205 |
| 2004/0120345 A1 * | 6/2004 | Yamaguchi et al. .......... | 370/465 |
| 2004/0212729 A1 * | 10/2004 | Yamaguchi et al. ......... | 348/387.1 |
| 2005/0104848 A1 * | 5/2005 | Yamaguchi et al. .......... | 345/156 |
| 2005/0129321 A1 * | 6/2005 | Yamaguchi et al. .......... | 382/239 |
| 2007/0120958 A1 * | 5/2007 | Sunahara ..................... | 348/14.01 |
| 2007/0201563 A1 * | 8/2007 | Yamaguchi et al. ..... | 375/240.26 |
| 2010/0150454 A1 * | 6/2010 | Sunahara ..................... | 382/218 |
| 2012/0150454 A1 * | 6/2012 | Lee et al. ....................... | 702/45 |

FOREIGN PATENT DOCUMENTS

| | | |
|---|---|---|
| JP | 5 75988 | 3/1993 |
| JP | 6 339137 | 12/1994 |
| JP | 9 214916 | 8/1997 |
| JP | 11 112569 | 4/1999 |
| JP | 2004 120460 | 4/2004 |
| JP | 2005 33424 | 2/2005 |
| JP | 2005-210160 | 8/2005 |
| JP | 2006 229456 | 8/2006 |

* cited by examiner

*Primary Examiner* — Maria El-Zoobi
(74) *Attorney, Agent, or Firm* — Frommer Lawrence & Haug LLP; William S. Frommer

(57) ABSTRACT

In a communication system in which moving image data is transmitted/received between two terminal apparatuses connected to a best-effort network and bi-directional communication is realized in real time, each of the terminal apparatuses includes a reproduced picture quality judgment section that judges reproduced picture quality relating to the moving image data received from the terminal apparatus of an opposite party and notifies it as reproduced picture quality information to the opposite party, and a reproduced picture quality control section that controls picture quality of a transmitted image displayed for confirmation at a side of the apparatus itself to become the reproduced picture quality notified by the reproduced picture quality information.

13 Claims, 9 Drawing Sheets

FIG. 3

| LAYER | RESOLUTION | J2K PACKET No. |
|---|---|---|
| L 0 | 0 | 0 |
|  | 1 | 1 |
|  | 2 | 2 |
| L 1 | 3 | 3 |
|  | 4 | 4 |
|  | 5 | 5 |
| L 2 | 6 | 6 |
|  | 7 | 7 |
|  | 8 | 8 |

| FRAME ID | LAYER INFORMATION |

COMMUNICATION SYSTEM, TERMINAL APPARATUS AND COMPUTER PROGRAM

CROSS REFERENCES TO RELATED APPLICATIONS

The present invention contains subject matter related to Japanese Patent Application JP 2005-344746 filed in the Japanese Patent Office on Nov. 29, 2005, the entire contents of which being incorporated herein by reference.

BACKGROUND OF THE INVENTION

1. Field of the Invention

The present invention described in the present specification relates to a technique to support bi-directional communication using transmission/reception of moving images.

The invention proposed by the inventor has aspects of a communication system, a terminal apparatus and a computer program.

2. Background Art

In a TV conference system in a digital line in related art, ISDN is used as the communication line. In the ISDN, communication bandwidth is guaranteed. Accordingly, the communication rate is constant, and data loss hardly occurs.

However, in recent years, instead of the ISDN with a narrow bandwidth, the use of an IP (Internet Protocol) based Internet network is being rapidly increased as the communication line.

In ADSL (asymmetric digital subscriber line) or optical line using the Internet network, there is provided a best-effort service in which the bandwidth is not guaranteed (hereinafter, a network in which this kind of service is provided will be referred to as a best-effort network). However, in this kind of network, the communication state varies from hour to hour.

Thus, there is a possibility that a packet loss due to congestion or a bit error occurs.

As a result, damage, disturbance, skip and the like occur in the transmitted image and audio data.

In addition to this, in the Internet network, the channel quality of the uplink and the channel quality of the downlink do not generally coincide with each other.

Thus, in a TV conference system or a TV telephone system in related art, there can arise a state where although an image is received without loss at one side, it can not be received at all at the other side.

In this case, the user A whose reception state is excellent does not notice the state of the user B whose reception state is unstable, and continues the conversation in a unilateral way, and after a while, he/she notices the state of the opposite party.

Then, there is proposed a contrivance in which the occurrence of a communication abnormality on the transmission path is detected, and is notified to the user A whose reception state is excellent.

[Patent document 1] JP-A-2005-210160

SUMMARY OF THE INVENTION

However, the technique proposed in the related art is the technique which notifies the transmitter side whether the transmitted image can be displayed at the opposite side. That is, it is the technique to binarily notify whether the reception state is excellent or poor.

Then, the inventor puts following processing devices in a terminal apparatus which transmits/receives moving image data to/from a terminal apparatus of an opposite party connected to a best-effort network and realizes bi-directional communication in real time.

(a) A reproduced picture quality judgment section that judges reproduced picture quality relating to the moving image data received from the terminal apparatus of the opposite party and notifies it as reproduced picture quality information to the opposite party.

(b) A reproduced picture quality control section that controls picture quality of a transmitted image displayed for confirmation at the side of the apparatus itself to become the reproduced picture quality notified by the reproduced picture quality information.

When the invention proposed by the inventor is adopted, the picture quality of the transmitted image actually reproduced and displayed on the opposite party can be reproduced and displayed in real time on the transmission side. Thus, the users of the communication system can confirm the mutual communication states in real time, and smooth communication can be realized.

BRIEF DESCRIPTION OF THE DRAWINGS

FIG. 3 is a view showing an example of a hierarchical structure of an RTP packet.

DESCRIPTION OF PREFERRED EMBODIMENTS

Hereinafter, a description will be given to embodiments of a communication system having a technique by which picture quality of a received image displayed on the opposite party can be reproduced and displayed on the transmission side.

Incidentally, a well-known or public technique in this technical field is applied to a portion which is not particularly illustrated or described in the present specification.

Besides, the embodiments described below are merely embodiments of the invention, and the invention is not limited to these.

(A) Television Conference System (a) System Structure

Figure 1:
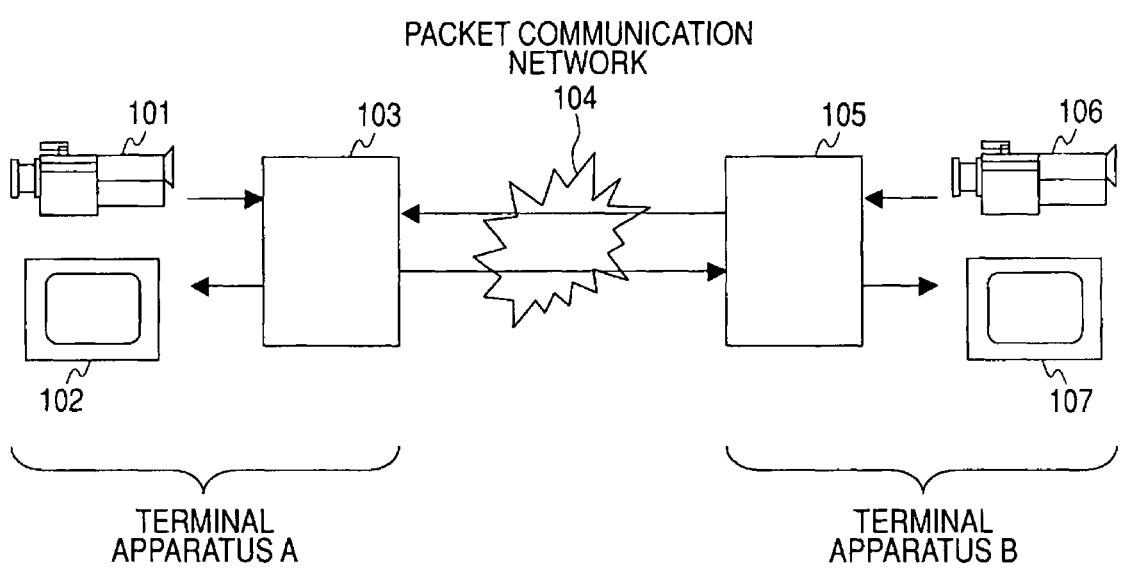
FIG. 1 is a view showing an example of a structure of a television conference system.

FIG. 1 shows an example of a structure of a television conference system.

FIG. 1 shows the television conference system including two terminal apparatuses A and B connected to a best-effort network. Although three or more terminal apparatuses can be actually connected to a network, processing functions proposed by the inventor are realized in a one-to-one connection form shown in FIG. 1. Incidentally, in the following description, a case where a packet communication network 104 is used as the best-effort network will be described.

The terminal apparatus A includes an image pickup device 101 to take an image of a participant of the television conference, a network terminal 103, and a display device 102 to display a received image.

The terminal apparatus B similarly includes an image pickup device 106 to take an image of a participant of the television conference, a network terminal 105, and a display device 107 to display a received image.

Here, although the description will be made on the structure in which the terminal apparatus is the combined system of the image pickup device, the network terminal, and the display device, all of or part of these can be provided in one apparatus.

The network terminal is provided with plural processing functions described below. Incidentally, the inner structure of the network terminal 103 and that of the network terminal 105 are the same. Accordingly, in the following, the respective processing functions will be described using the network terminal 103 as an example.

One of the processing functions is the processing function to compression-code moving image data received from the image pickup device 101. This processing function is provided for improvement of transmission efficiency and effective use of a storage area.

One of the processing functions is the processing function to packetize the compression-coded moving image data and to output it to the packet communication network 104. This processing function is provided for data transfer through the packet communication network 104.

One of the processing functions is the processing function to display the moving image data (transmitted image) received from the image pickup device 101 on the display device 102. This processing function is provided so that the content of the transmitted image can be confirmed at the transmission source. Besides, this processing function is used also to confirm the picture quality of the transmitted image on the opposite party.

One of the processing functions is the processing function to decode the moving image data (received image) received from the opposite party and to display it on the display device 102. This processing function is provided for confirmation of the received image.

One of the processing functions is the processing function to transmit information (reproduced picture quality information) relating to the reproduced picture quality of the received image as a decoding result to the network terminal 105 as the communication partner.

Incidentally, in addition to these processing functions, as the need arises, the network terminal 103 is provided with a processing function to make a retransmission request when packet loss occurs, and a processing function to retransmit a specific packet in response to the retransmission request.

Incidentally, the display device may be any one of a cathode-ray tube, a flat panel display, and a projector. Besides, the number of display devices is not limited to one, but may be plural.

For example, in the case where one display device is used, the transmitted image transmitted by the apparatus itself to the opposite party has only to be displayed in a part of the display area of the received image. Besides, for example, in the case where plural display devices are used, one for display of the received image and one for display of the transmitted image may be separately used. The number of the display devices and the use method depend on the use object of the system user and the operational policy.

Besides, in this system example, although the image pickup device 101 is exemplified as the transmission device to supply the moving image (video) to the network terminal, an image reproduction device may be adopted.

(b) Inner Structure (Function Structure) of the Network Terminal

Figure 2:
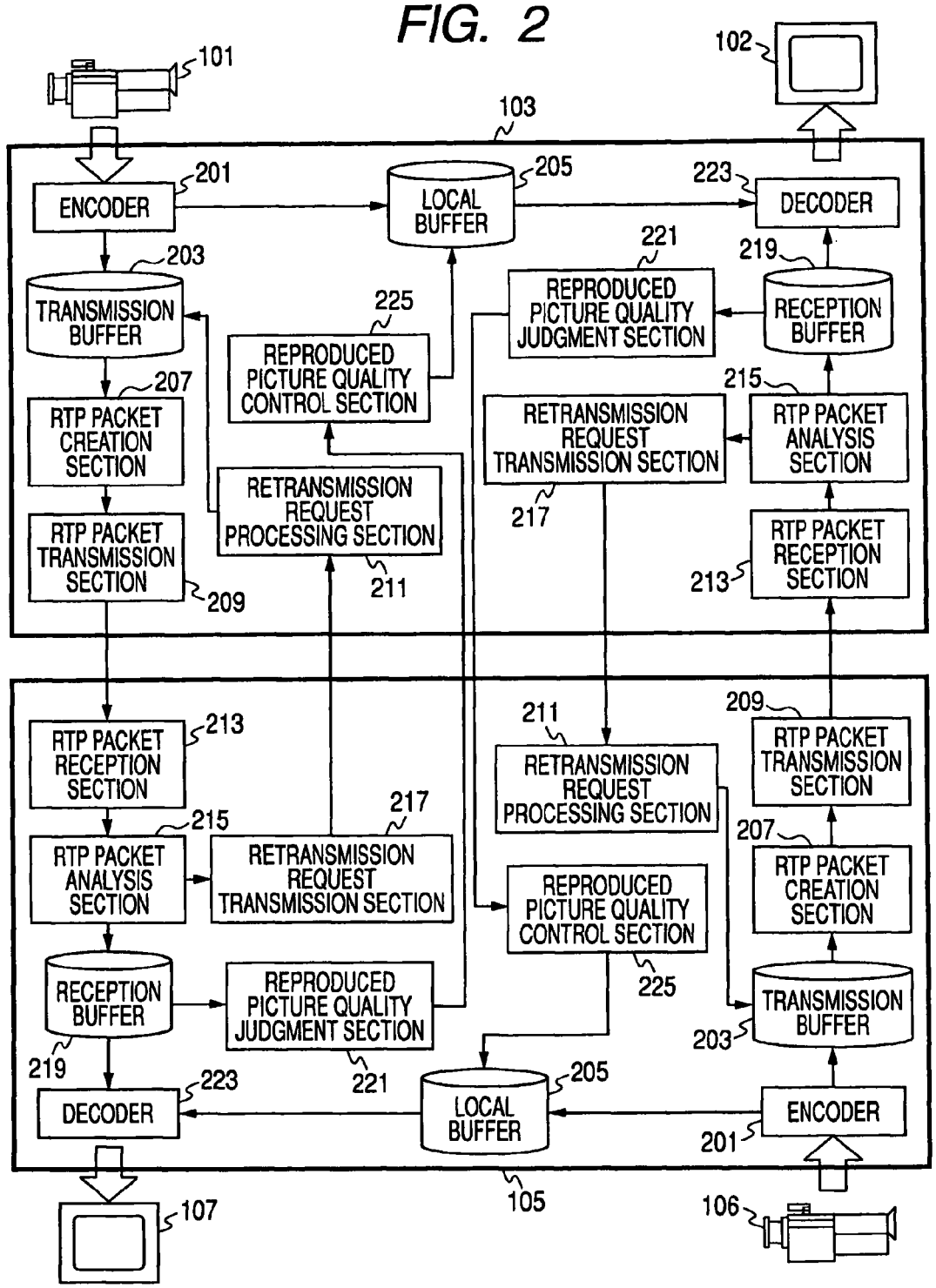
FIG. 2 is a view showing an example of an inner structure of a network terminal.

An example of the inner structure of the network terminal will be described with reference to FIG. 2. Incidentally, in FIG. 2, portions corresponding to those of FIG. 1 are denoted by the same reference numerals. Indeed, since the inner structures of the network terminals are equal to each other, irrespective of the terminal apparatus A side or the terminal apparatus B side, processing function sections constituting the network terminal are denoted by the same reference numerals.

An encoder 201 is a processing device to encode moving image data inputted from an image pickup device. In the case of this example, the encoder 201 uses a hierarchical compression coding system to compress the moving image data. The hierarchical compression coding system here includes, for example, JPEG2000 (Joint Photographic Experts Group) and MPEG (Moving Picture Experts Group). The former is a typical example of intra-frame compression coding, and the latter is a typical example of inter-frame compression coding system.

A transmission buffer 203 is a storage area for holding the moving image data compression-coded by the encoder 201 for transmission.

A local buffer 205 is a storage area for holding the moving image data (transmitted image) compression-coded by the encoder 201 for confirmation at the side of the apparatus itself.

An RTP (Realtime Transport Protocol) packet creation section 207 is a processing device to convert the moving image data held in the transmission buffer 203 into RTP packets.

An RTP packet transmission section 209 is a processing device to transmit the RTP packets to a packet communication network 104.

A retransmission request processing section 211 is a processing device to control a series of processings in which in the case where a retransmission request is received from a network terminal 105 as a transmission destination (opposite party) of the RTP packets, the moving image data corresponding to an RTP packet to be retransmitted is retrieved from the transmission buffer 203, is again converted into the RTP packet, and is transmitted to the packet communication network 104.

An RTP packet reception section 213 is a processing device to receive RTP packets from the packet communication network 104. Incidentally, in the case where the RTP packet is redundancy-coded, the RTP packet reception section 213 executes also an error correction processing. By the error correction processing, a loss in a transmission path can be recovered to a certain extent.

An RTP packet analysis section 215 is a processing device that analyzes the RTP packet transferred from the RTP packet reception section 213, and notifies, in a case where there is a loss, a retransmission request transmission section 217.

Incidentally, the RTP packet is coded into, for example, a hierarchical structure shown in FIG. 3. In the case of FIG. 3, the moving image data is hierarchy-coded into three stages of hierarchies L0 to L2, and each of the hierarchies L0 to L2 is further hierarchized into three resolutions. A packet number (FIG. 3 shows an example of JPEG2000) is given to each of the resolutions, and an RTP packet lost on the transmission path is specified through the packet number.

The retransmission request transmission section 217 is a processing device to transmit a packet which requests the transmission side to retransmit the RTP packet the loss of which is confirmed by the analysis in the RTP packet analysis section 215. In general, a time-out is set, and in the case where a normal RTP packet is not received although the time-out time has passed, the retransmission request of the relevant packet is deleted from the management object.

A reception buffer 219 is a storage area to hold the received RTP packet.

A reproduced picture quality judgment section 221 is a processing device to judge the reproduced picture quality when an image of one frame is reproduced. The judgment result is notified to the transmission side network terminal through the packet communication network 104.

A decoder 223 is a processing device that decodes frame data read out from the reception buffer 219 and outputs it as a received image to a display device. Incidentally, in the case where reproduced picture quality information from the opposite party has arrived, the decoder 223 executes a processing to decode the frame data at the side of the apparatus itself read out from the local buffer 205 in accordance with the reproduced picture quality information, and to output it as the transmitted image to the display device. In the case of this example, the transmitted image is displayed as a small screen.

Incidentally, the frame data read out from the local buffer 205 to the decoder 223 may be only the data of the resolution corresponding to the display size of the transmitted image.

A reproduced picture quality control section 225 is a processing device to control the gradation of data to be transferred to the decoder 223 from the local buffer 205 based on the reproduced picture quality information notified from the opposite party.

(c) Hierarchy Coding of JPEG2000

Here, the hierarchy coding of JPEG2000 will be complemented.

FIG. 3 shows the hierarchical structure of JPEG2000. In the figure, "J2K packet" means a packet hierarchy-coded in JPEG2000. FIG. 3 shows an example in which J2K-packetization is performed in SNR progressive order.

In the case of this example, even if packets after the packet number No. 3 do not arrive, since there is no loss in the packets of the layer 0, the received image corresponding to the layer 0 can be reproduced.

On the other hand, when the packets up to the packet number No. 5 arrive, the corresponding received image up to the layer 1 can be reproduced.

As stated above, in the JPEG2000, even if all packets do not arrive, an image up to a reproducible layer can be reproduced.

Besides, in the case where an image with low resolution is displayed like a sub-screen, it is not necessary to use all J2K packets. For example, by using the packet numbers 0, 3 and 6, an image with a low resolution can be reproduced. That is, it is not necessary that the local buffer 205 for transmitted image confirmation (for sub-screen) holds all data.

Besides, the reproduced picture quality control section 225 selects, as packets to be used for the decode processing, only packet 0, packets 0 and 1, or the like based on the reproduced picture quality information received from the opposite party. By this, the picture quality up to an arbitrary layer can be obtained at a resolution suitable for the confirmation of the transmitted image.

(d) Transmission Processing Procedure of Moving Image Data

Figure 4:
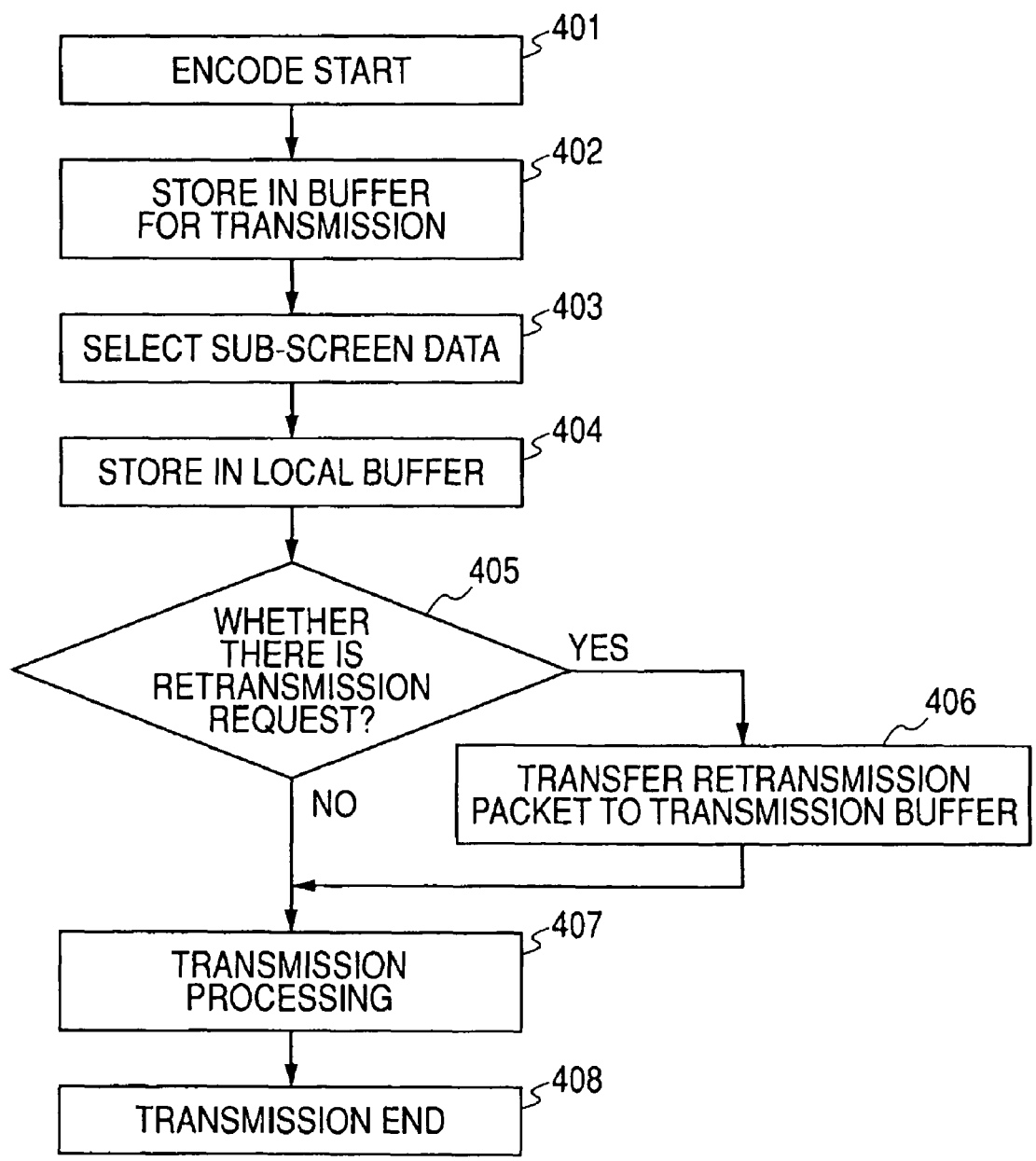
FIG. 4 is a view showing an example of a transmission processing procedure of moving image data.

A processing procedure at the time when the terminal apparatus transmits the moving image data to the terminal apparatus of the opposite party will be described with reference to FIG. 4.

First, the network terminal 103 captures one frame of the moving image data taken by the image pickup device 101, and compression-codes it by the encoder 201 (processing 401).

The network terminal 103 transfers the compression-coded moving image data to the transmission buffer 203 and holds it until readout (processing 402).

Besides, the network terminal 103 selectively holds a part of the compression-coded moving image data into the local buffer 205 for confirmation (for small screen display) of the transmitted image in the apparatus itself (processing 403, processing 404).

As described before, in the case where the codec of JPEG2000 or the like is used, and in the case where an image with a low resolution is made to remain for confirmation (for sub-screen display) of the transmitted image, all data is not held, and only data with resolution necessary for the sub-screen is held.

Thereafter, the network terminal 103 judges the presence/absence of a retransmission request (processing 405). In the case where there is a retransmission request, the network terminal 103 transfers the requested packet to the transmission buffer 203 (processing 406). In the case where there is no retransmission request or when the transfer of the retransmission packet to the transmission buffer 203 is ended, the network terminal 103 RTP paketizes the data stored in the transmission buffer 203, and transmits it to the packet communication network 104 (processing 407, processing 408).

(e) Reception Processing Procedure of Moving Image Data

Figure 5:
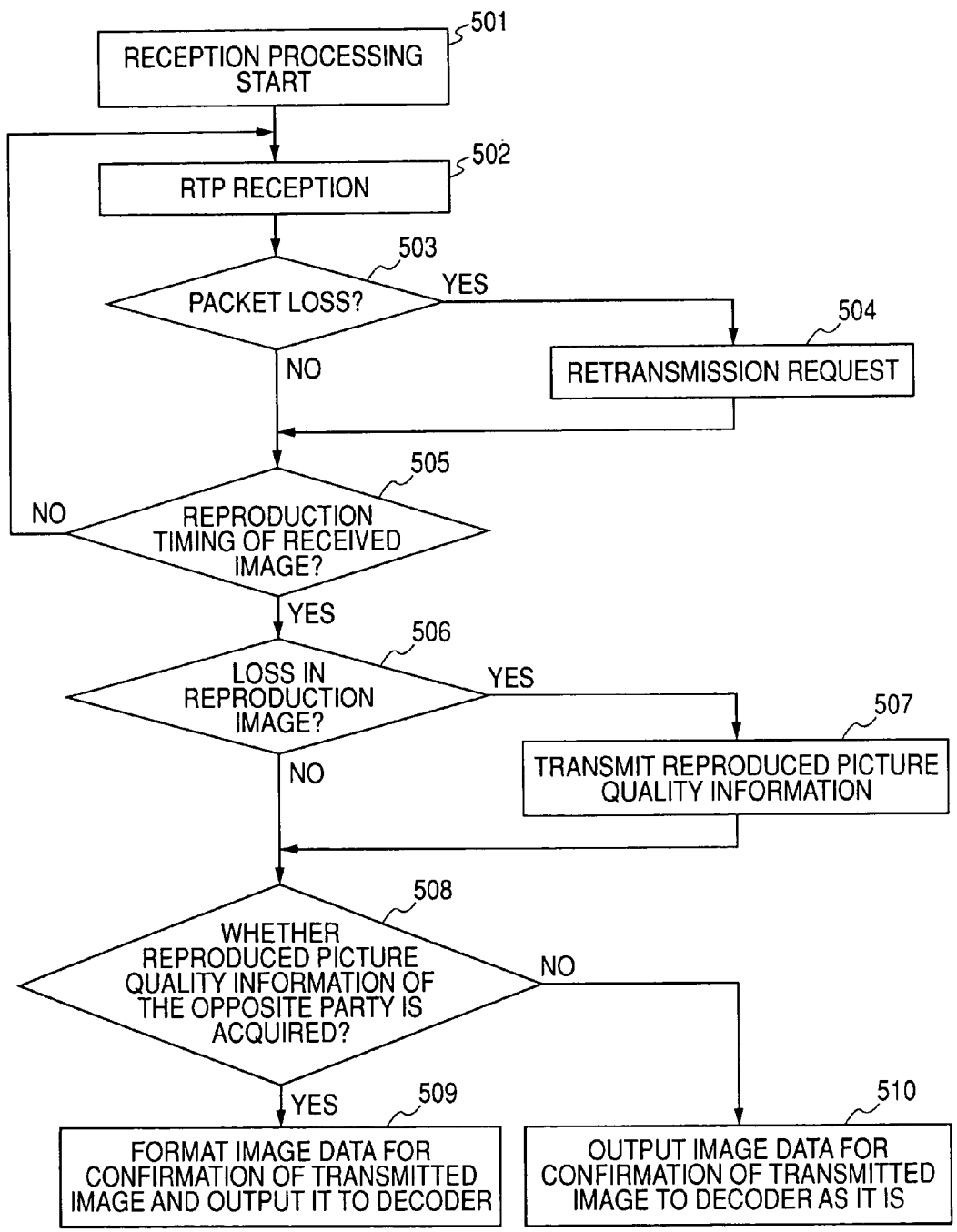
FIG. 5 is a view showing an example of a reception processing procedure of moving image data.

A series of processing procedures executed when the terminal apparatus receives the moving image data from the terminal apparatus of the opposite party will be described with reference to FIG. 5.

First, the network terminal 105 receives a packet by the RTP packet reception section 213, and analyses the header of the RTP packet by the RTP packet analysis section 215 (processing 501, processing 502).

Here, when judging from a lack of a sequence number or the like that a loss occurs (affirmative result in processing 503), the network terminal 105 requests the network terminal 103 as the transmission origin to retransmit the RTP packet (processing 504).

In the case where the retransmission of the RTP packet is requested, it is necessary to wait for the reproduction timing of the received image until the retransmission operation is completed. Thus, the network terminal 105 repeats this loop processing until the image reproduction timing (processing 505).

When the reproduction timing of the frame image arrives, the network terminal 105 reconstructs the data of the frame to be reproduced from the RTP packet, and judges the presence/absence of a loss of the RTP packet (processing 506).

In the case where there is a loss in the RTP packet, the network terminal 105 judges the quality of the reproduced image, and transmits the reproduced picture quality information to the network terminal 103 as the transmission origin, and transfers the reproduced moving image data to the decoder 223 (processing 507).

Figure 6:
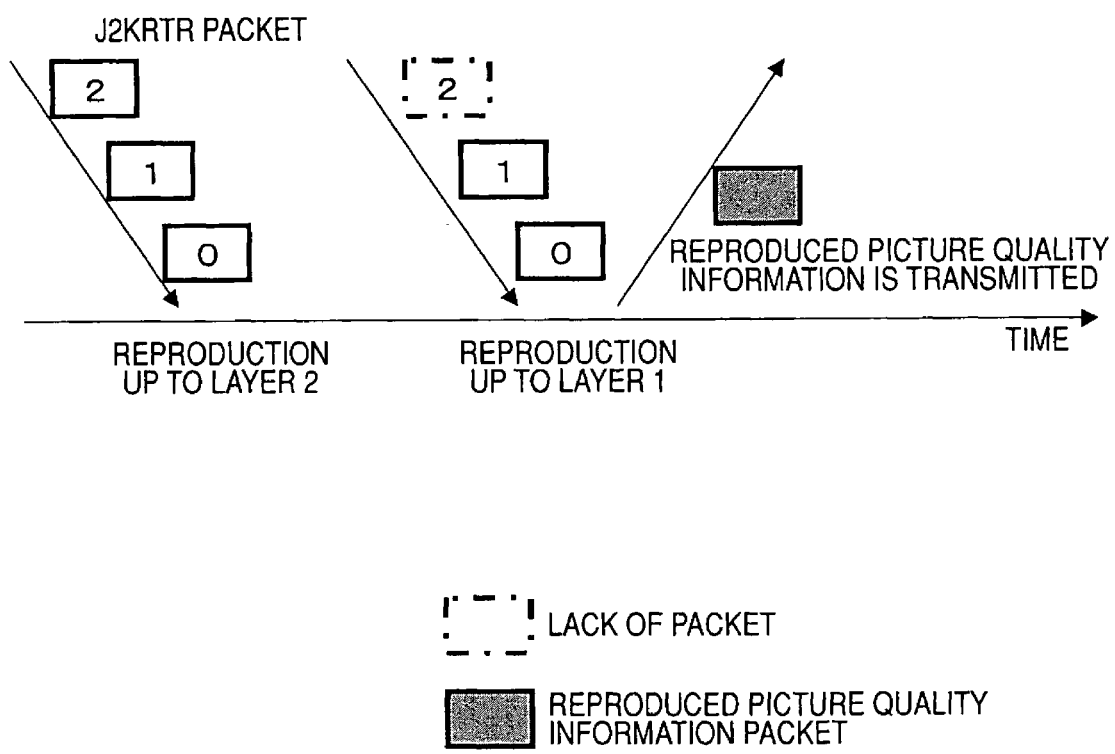
FIG. 6 is a view showing transmission timing of reproduced picture quality information.

FIG. 6 shows the content of this processing. FIG. 6 shows a case where moving image data including three layers of layer 0, layer 1 and layer 2 are transmitted. In the figure, a frame indicated by a square corresponds to a J2K packet, and a numeral in the frame indicates layer information.

As shown in FIG. 6, in the case where the reproduction can be performed up to the uppermost layer 2, the reproduced picture quality information is not transmitted. On the other hand, in the case where the reproduction can be performed up to the layer 1 or layer 0, or can not be reproduced at all, information relating to the number of layers which can be reproduced is transmitted as a reproduced picture quality information packet to the transmission origin of the image.

Incidentally, the "reproduced picture quality" may be color component information or resolution information in addition to the layer information described in this example.

Thereafter, prior to the reproduction of the received image, the network terminal 105 judges whether or not the reproduced picture quality information is received from the network terminal 103 as the communication partner (processing 508).

In the case where the reproduced picture quality information is received, the network terminal 105 formats the image data used for the confirmation of the transmitted image and outputs it to the decoder 223 (processing 509). On the other hand, in the case where the reproduced picture quality information is not received, the network terminal 105 outputs the image data for confirmation held in the local buffer 205 to the decoder 223 as it is (processing 510).

Figures 7, 8:
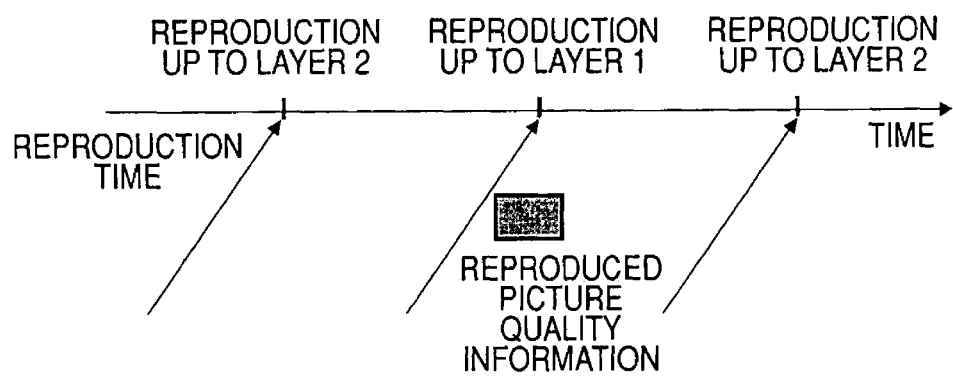
FIG. 7 is a view showing a relation between reception timing of reproduced picture quality information and picture quality reflected in a transmitted image.
FIG. 8 is a view showing an example of a format of reproduced picture quality information.

FIG. 7 exemplifies how the reproduced picture quality reproduced for the confirmation of the transmitted image changes before/after the reception of the reproduced picture quality information.

In the case where frame data including three layers of layer 0, layer 1 and layer 2 are held in the local buffer 205, when the reproduced picture quality information is not received, the reproduced picture quality control section 225 instructs the reproduction of the transmitted image at the resolution up to the layer 2.

On the other hand, in the case where the frame data including the three layers of layer 0, layer 1 and layer 2 are held in the local buffer 205, when the reproduced picture quality information is received, the reproduced picture quality control section 225 instructs the reproduction of the transmitted image at the picture quality up to the hierarchy notified by the reproduced picture quality information, for example, up to the layer 0 or the layer 1, or at such a picture quality that the frame is lost. FIG. 7 shows a case where the reproduction is performed up to the layer 1.

(f) Example of Format of Reproduced Picture Quality Information

FIG. 8 shows an example of a format of reproduced picture quality information. Incidentally, FIG. 8 shows a case where a transmission unit is a frame.

This format includes only fields of an identifier (that is, frame ID) to specify an image frame and the number of layers which could be reproduced. In the case where there is no identifier to specify the image, this field is made "0". In the case where there is no layer which could be reproduced with respect to a certain image, "0" is inputted to the field of the layer.

The foregoing reproduced picture quality control section 225 selects, based on these information, data to be read into the decoder 223 from the local buffer 205 in which the image data corresponding to the transmitted image of the apparatus itself is stored.

In the case where the reproduced picture quality information in which "0" is placed in the layer field is received, the reproduced picture quality control section 225 again selects the last decoded image data as an object to be decoded, so that the image for confirmation of the transmitted picture quality is made still (frozen).

Figure 9A:
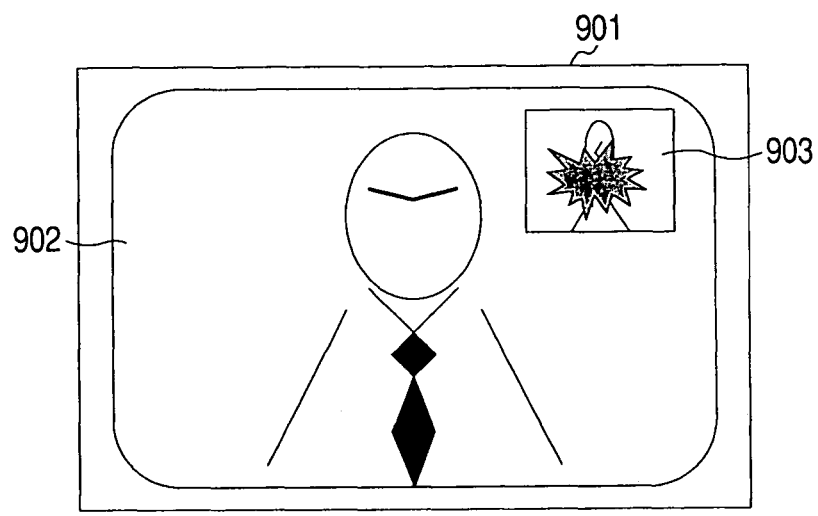
FIGS. 9A and 9B are views showing examples of display screens during a television conference.
Figure 9B:
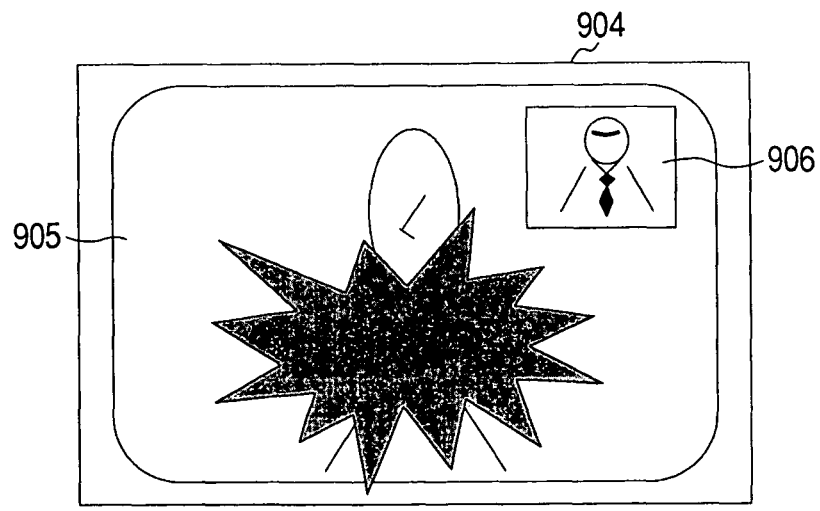

(g) State in which Reproduced Picture Quality at Reception Side is Reflected in the Confirmation Screen of Transmission Origin FIGS. 9A and 9B show examples of display screens during the television conference. FIG. 9A shows an example of a screen displayed on the display device of the terminal apparatus A, and FIG. 9B shows an example of a screen displayed on the display device of the terminal apparatus B.

A display screen 901 shown in FIG. 9A includes a main screen 902 and a small screen 903. The received image received from the terminal apparatus B through the packet communication network is displayed on the main screen 902. Besides, the transmitted image transmitted to the terminal apparatus B through the packet communication network is displayed on the small screen 903.

A display screen 904 shown in FIG. 9B includes a main screen 905 and a small screen 906. The received image received from the terminal apparatus A through the packet communication network is displayed on the main screen 905. Besides, the transmitted image transmitted to the terminal apparatus A through the packet communication network is displayed on the small screen 906.

In general, since the transmitted image displayed on the small screen is based on the processing in the apparatus itself, it is not influenced by the communication state on the packet communication network. However, as in this specific example, since the reproduced picture quality control section 225 is provided, a lowering in picture quality equal to the degree of a lowering in picture quality of the received image (FIG. 9B) at the terminal apparatus B side can be confirmed on the sub-screen (FIG. 9A) at the terminal apparatus A side.

Thus, the user of the terminal apparatus A can confirm the disturbance or lowering of the opposite side screen. That is, among the users of the television conference system, the communication under the common recognition on the mutual received images can be realized. This is effective in reducing the repetition of an explanation and the occurrence of misunderstanding.

Incidentally, when the display timing of the transmitted image to be displayed on the small screen is controlled, the image frames in which the disturbance of the screen or the loss occurs can be made coincident with each other. However, when it is sufficient if both parties can recognize the occurrence of the disturbance of the screen, a time shift may occur between the image frame in which the lowering in picture quality or the like occurs at the opposite party and the image frame in which the picture quality is lowered on the small screen at the side of the apparatus itself.

(h) Effects in the Television Conference System

As described above, since the function is provided which lowers the picture quality of the transmitted image displayed on the small screen also at the side of the apparatus itself in synchronization with the lowering in picture quality of the display image or the like at the communication partner side, more accurate communication can be realized also in the case where the television conference is held through the best-effort network.

That is, it is possible to solve the inconvenience that as in the system of the related art, the transmitted image of the same picture quality is always displayed on the small screen at the side of the apparatus itself, and the reception state of the opposite party can not be recognized.

For example, it is possible to eliminate a failure in the conversation due to the lowering in picture quality of the received image and the repetition of the same speech due to this.

Besides, for example, also in the case where the conversation is reopened, since the transmission side can easily recognize the time point when the conversation is to be reopened, the conversation can be reopened under the mutual common recognition.

As a result, the very convenient television conference system can be realized.

(B) Other Embodiments (a) In the foregoing operation description of the example of the system, the description has been made while the case where the moving image data intra-frame coded by JPEG2000 system is mainly transmitted to the opposite party is used as an example, the invention can be applied also to the case where the moving image data inter-frame coded by MPEG or the like is transmitted to the opposite party.

Figure 10:
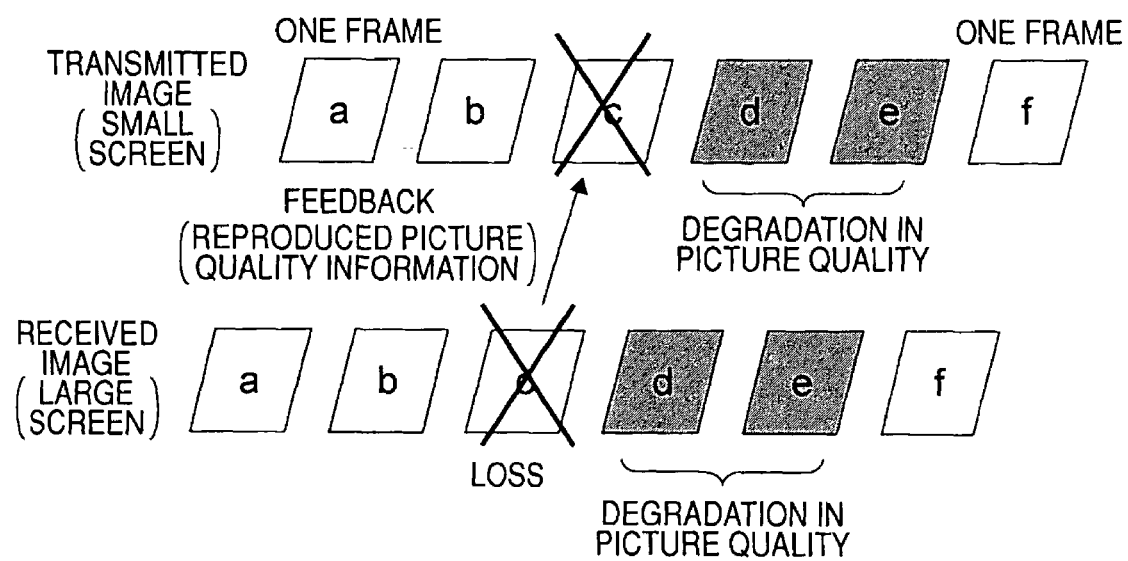
FIG. 10 is a view showing a relation between transmission timing of reproduced picture quality information and picture quality reflected in a transmitted image in the case where an inter-frame coding system is adopted for transmission of moving image data.

FIG. 10 shows an example of this case. In the inter-frame coding system such as MPEG or the like, there is a possibility that a loss of one frame influences other plural frames.

Also in this case, when the loss (lack) of a frame is fed back to the network terminal at the transmission side, the lowering in picture quality of the influenced frame can be reflected in the picture quality of the transmitted image displayed on the small screen.

The upper part of FIG. 10 shows an example of an image display at the transmission side, and the lower part thereof shows an example of a screen display at the reception side. As shown in FIG. 10, it is understood that the picture quality of the transmitted image displayed for confirmation at the transmission side is connected with the lowering in picture quality at the reception side by the feedback of the reproduced picture quality information.

(b) In the operation description of the system example, the description has been made on the case where as the reproduced picture quality information, the hierarchical information of the image data which could be finally decoded, that is, the layer information is transmitted to the terminal apparatus at the transmission side.

However, as the reproduced picture quality information, information to specify a missing flame (including an intra-frame coded frame and an inter-frame coded frame), information to specify a missing packet, and so on can also be used. Also when these informations are used, the same effect as the foregoing system example can be realized.

(c) In the foregoing description, although the description has been made on the case where the invention is applied to the television conference system, the invention can also be applied to a television telephone system.

(d) The terminal apparatus constituting the foregoing system example may be a stationary apparatus or a portable apparatus. Besides, for the connection to the best-effort network, a wired cable may be used, or a radio wave may be used.

Incidentally, the commodity form of the terminal apparatus is arbitrary, and can be realized also as, for example, a television conference dedicated terminal, a television telephone dedicated terminal, a computer, a printing apparatus, a video camera, a digital camera, a game equipment, a scanner, a portable information terminal (portable computer, portable telephone, portable game machine, electronic book, etc.), a watch, an image reproducing apparatus (for example, an optical disk apparatus, home server), a monitor, a television receiver, or a processing board or processing card provided with the functions of the invention.

(e) The individual processing functions constituting the network terminal can be realized as hardware or software.

Besides, not only all of these processing functions are realized by the hardware or software, but also part thereof may be realized by using the hardware or software. That is, the combination of the hardware and software may be adopted.

(f) With respect to the foregoing embodiments, various modified examples are conceivable within the scope of the gist of the invention. Besides, various modified examples and applied examples created or combined based on the recitation of the specification are also conceivable.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system in which moving image data is transmitted/received between two terminal apparatuses connected to a best-effort network and bi-directional communication is realized in real time, wherein each of the terminal apparatuses comprises:
a reproduced picture quality judgment section that judges reproduced picture quality of a first image relating to the moving image data received from the terminal apparatus of an opposite party and provides the reproduced picture quality information to the opposite party; and
a reproduced picture quality control section that controls picture quality of a second image that corresponds to a transmitted image transmitted to the opposite party, wherein the picture quality of the second image is controlled in accordance with the reproduced picture quality information of the transmitted image provided by the opposite party; and
a display section that displays the first image and the picture quality-controlled second image.

2. The communication system according to claim 1, wherein the reproduced picture quality information is given as hierarchical information of the image data.

3. The communication system according to claim 1, wherein the reproduced picture quality information is given as information to specify a missing frame.

4. The communication system according to claim 1, wherein the reproduced picture quality information is given as information to specify a missing packet.

5. The communication system according to claim 1, wherein the reproduced picture quality information is missing information of an inter-frame coded frame.

6. The communication system according to claim 1, wherein the reproduced picture quality information is missing information of an intra-frame coded frame.

7. The communication system according claim 1, wherein the reproduced picture quality control section controls reading of the second image in an inside of the apparatus itself so that an image frame as a picture quality control object coincides with an image frame specified by the reproduced picture quality information.

8. The communication system according to claim 1, wherein the reproduced picture quality control section controls picture quality of an arbitrary image frame displayed at the side of the apparatus at a reception time point of the reproduced picture quality information.

9. The communication system according to claim 1, wherein the terminal apparatus is provided with a wireless communication function.

10. The communication system according to claim 1, wherein the terminal apparatus is a terminal apparatus for a television conference service.

11. The communication system according to claim 1, wherein the terminal apparatus is a terminal apparatus for a television telephone service.

12. A terminal apparatus which transmits/receives moving image data to/from a terminal apparatus of an opposite party connected to a hest-effort network and realizes bi-directional communication in real time, comprising:
   a reproduced picture quality judgment section that judges reproduced picture quality of a first image relating to the moving image data received from the terminal apparatus of the opposite party and provides the reproduced picture quality information to the opposite party; and
   a reproduced picture quality control section that controls picture quality of a second image that corresponds to a transmitted image transmitted to the opposite party, wherein the picture quality of the second image is controlled in accordance with the reproduced picture quality information of the transmitted image provided by the opposite party; and
   a display section that displays the first image and the picture quality-controlled second image.

13. A non-transitory storage medium storing a program causing a computer mounted in a terminal apparatus, which transmits/receives moving image data to/from a terminal apparatus of an opposite party connected to a best-effort network and realizes bi-directional communication in real time, to execute:
   a processing of judging reproduced picture quality relating to the moving image data of a first image received from the terminal apparatus of the opposite party and providing the reproduced picture quality information to the opposite party; and
   a processing of controlling picture quality of a second image that corresponds to a transmitted image transmitted to the opposite party, wherein the picture quality of the second image is controlled in accordance with the reproduced picture quality provided by the opposite party; and
   a processing of displaying the first image and the second image.

* * * * *